Sept. 23, 1958  G. D. WILSON  2,853,029
PREPARATION OF DOUGH PIECES FOR BREAD
Filed Feb. 2, 1955  2 Sheets-Sheet 1

Inventor
George Donald Wilson.
By Learman & Learman
Attorneys

Sept. 23, 1958     G. D. WILSON     2,853,029
PREPARATION OF DOUGH PIECES FOR BREAD Filed Feb. 2, 1955     2 Sheets-Sheet 2

Inventor.
George Donald Wilson.
By Learmont & Learmont.
Attorneys.

United States Patent Office 2,853,029
Patented Sept. 23, 1958

2,853,029

PREPARATION OF DOUGH PIECES FOR BREAD

George Donald Wilson, Peterborough, England, assignor to Baker Perkins Incorporated, Saginaw, Mich.

Application February 2, 1955, Serial No. 485,687

Claims priority, application Great Britain February 4, 1954

3 Claims. (Cl. 107—54)

This invention relates to the preparation of dough pieces for bread baking and has for its object the preparation of an improved final texture in the loaf. While the invention is more especially suitable for the preparation of tin bread, it may also be advantageously applied to the preparation of oven bottom bread of elongated shape.

Normal procedures for the preparation of dough pieces for bread include passing a raw dough piece from a dough divider through a conical table hander which balls up the piece into approximately spherical shape and at the same time produces a thin skin on the piece to prevent sticking to the pocket of the first prover, to which the moulded dough piece is usually fed. Alternatively the raw dough piece may be passed from the dough divider to a spindle hander, in which it is caught up by and coiled round a pair of spindles without previous sheeting and, after withdrawal of the spindles, is rolled between two delivery bands before feeding to the first prover. In both instances the shaped dough pieces are generally passed through the first prover and then to a final moulder before being loaded into the tins or final proving means for proving and baking. The type of final moulder varies according to the final shape required for each piece and may include such known types as a conical table moulder, a spindle or multi-spindle moulder, a drum moulder, necking and cutting moulder, various types of cross coiling moulders, or specialized types of moulder for special bread production processes.

When a dough piece as received from the divider is formed into a spherical shape, as for instance by a conical table hander, or coiled direct from the divided dough piece in a spindle hander, the dough cells are of varying shapes and orientation; and it has been found that this heterogeneous cell arrangement inhibits to a noticeable extent the evenness with which cell division is accomplished on subseqeunt moulding operations, and consequently this may be prejudicial to the texture of the finished loaf.

According to the present invention the dough piece as received from the divider (or other cutting-off device) is treated in a manner such that the dough cells thereof are elongated and their major axes disposed more or less in one plane. This more regular arrangement of the dough cells has been found to result in more even cell division on subsequent moulding with consequent improvement in texture in the final loaf.

The invention consists in a process of preparing dough pieces for bread baking which comprises the consecutive steps of dividing or cutting from a dough mass or source a dough piece having a predetermined length corresponding substantially to a dimension of the loaf required, and which predetermined length is substantially maintained as a constant dimension throughout the preparation process, re-shaping or working the dough piece so that it is elongated into a sheet while maintaining its width as a sheet at said constant dimension, coiling the sheeted dough piece into a helical roll of a length equal to that of said constant dimension and loading the coiled dough piece either into a tin or a proving means for proving and baking. Before loading the coiled dough piece into the tin or the proving means, the coiled dough piece may further be subjected to rolling in known manner (e. g. between two moving bands or between a moving band and a stationary surface) and/or to a first proving and a final moulding operation in known manner followed by loading into the tin or proving means mentioned above for proving and baking.

It will be appreciated that the words "predetermined length corresponding substantially to a dimension of the loaf required" include a dimension of the tin in the case of tin bread.

The invention further consists in apparatus for the preparation of dough pieces for bread baking, according to the method of the preceding paragraph, comprising sheeting roll means which elongate a dough piece, received from a dough divider (or other cutting-off device), such that its width as a sheet is maintained substantially the same as the length of the original dough piece and coiling means which coil the sheeted dough piece helically into a coiled dough piece of a length substantially equal to that of the original dough piece.

The invention still further consists in apparatus for the preparation of dough pieces for bread baking, according to the preceding paragraph, in which means are provided subsequent to the coiling means for rolling the coiled dough piece.

The sheeting rolls, according to the preceding paragraph may, for example, be provided with lateral flanges which prevent the dough piece widening as it is sheeted; or alternatively the sheeting roll means may comprise subsequent pairs of rolls rotating each at sufficiently increasing speed to elongate the sheet lengthwise while preventing its widening.

The coiling means used in association with the sheeting rolls may conveniently be of known type; thus, for example, similar to that shown in British Patent No. 600,930, which describes a flexible mesh type of coiler, or alternatively, similar to that shown in British Patent No. 480,869, which shows a coiling grid which has a rigid mesh and is supported by a double pivot arrangement so that it can ride up on the dough piece as the latter is coiled. The requisite coiling may still further be obtained by the use of chains, for example as shown in British Patent No. 549,584.

Figure 1:
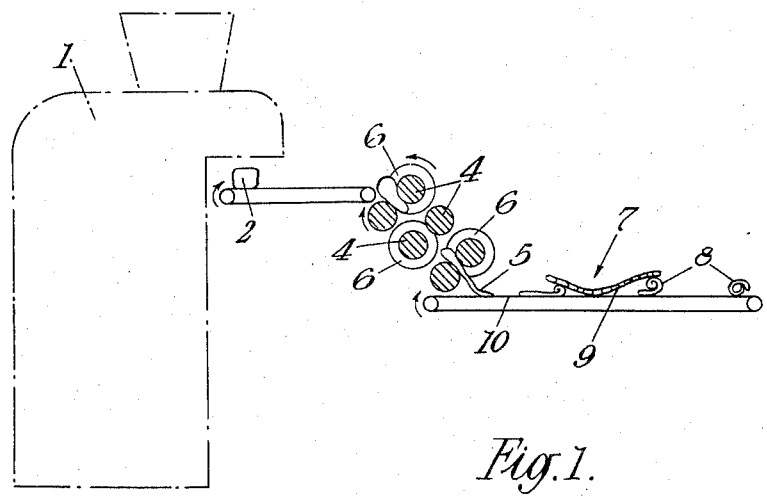
Figure 1 shows a schematic elevational view of the dough sheeting apparatus.
Figure 2:
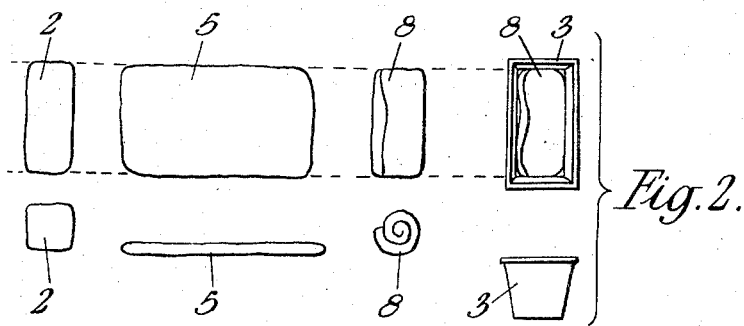
Figure 2 shows bracketed, both in elevation and plan, the finished dough piece deposited in a pan and the three shaping stages that the dough piece undergoes before deposit in the pan.

In carrying the invention into effect according to one mode by way of example, a dough divider (or other cutting-off device), indicated at 1 in Figure 1 is arranged to produce a dough piece 2 which is approximately the length either of the bread tin 3 which is eventually to be filled (see Figure 2) or of the loaf required, for example each divided piece might be about 8" long by 2½" by 2½". Thus, for example, the dough piece 2 is passed between sheeting rolls 4, which elongate it into a sheet 5 only in the direction of travel to, say, a possible sheet length dimension of 12" to 13", while maintaining its sheet width dimension unchanged, e. g. at about 8", that is, the same as the length of the original dough piece, see Figure 2. No lateral extending of the dough takes place in sheeting from the original dough piece 2 to the dough sheet 5 and this may conveniently be accomplished by providing the sheeting rolls 4 with lateral flanges 6 which confine the margins of the sheet and prevent its widening.

The dough sheet 5 is passed from the sheeting rolls 4 to a coiling device, indicated at 7, whereat the dough sheet is coiled in a manner basically similar to that in which a Swiss roll is coiled, that is into a helical roll 8. It should be noted that in Figure 1 the dough pieces are shown closer together than they would be in practice.

The present invention is not confined to any particular form of coiling device but such may conveniently comprise a broad flexible rectangular flap-like member 9 preferably made of wire mesh, mesh chain or other yieldable material of a weight appropriate to arrest the dough sheet and cause it to coil on itself, while being carried beneath the coiling device on a moving conveyor 10 (as described in British patent specification No. 600,930).

Figure 3:
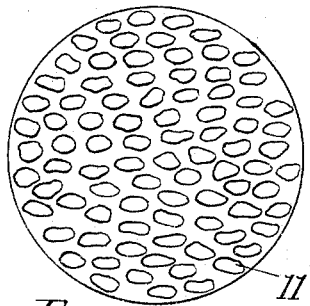
Figure 3 shows the cell structure of a sheeted dough piece produced by conventional means.

The effect of this sheeting and coiling treatment of the dough piece immediately after it has been divided is to modify the shape and disposition of the dough cells. When a dough piece as received from the divider is formed into a spherical shape, as for instance by a conical table hander, or coiled direct from the divided dough piece in a spindle hander, the dough cells 11 (see Figure 3) are of varying shapes and orientation and it has been found that this heterogeneous cell arrangement inhibits to a noticeable extent the evenness with which cell division is accomplished on subsequent moulding operations, and consequently this may be prejudical to the texture of the finished loaf.

Figure 4:
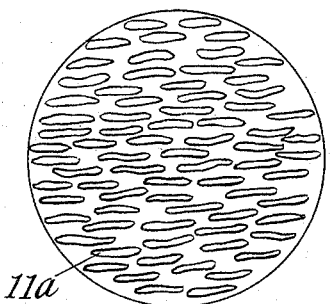
Figure 4 shows the cell structure of a sheet dough produced by the method of this invention.

According to the present invention the dough piece 2 as received from the divider (or other cutting-off device) is treated in the manner described such that the dough cells 11a (see Figure 4) thereof are elongated and their major axes disposed more or less in one plane. This more regular arrangement of the dough cells has been found to result in more even cell division on subsequent moulding with consequent improvement in texture in the final loaf.

Figure 5:
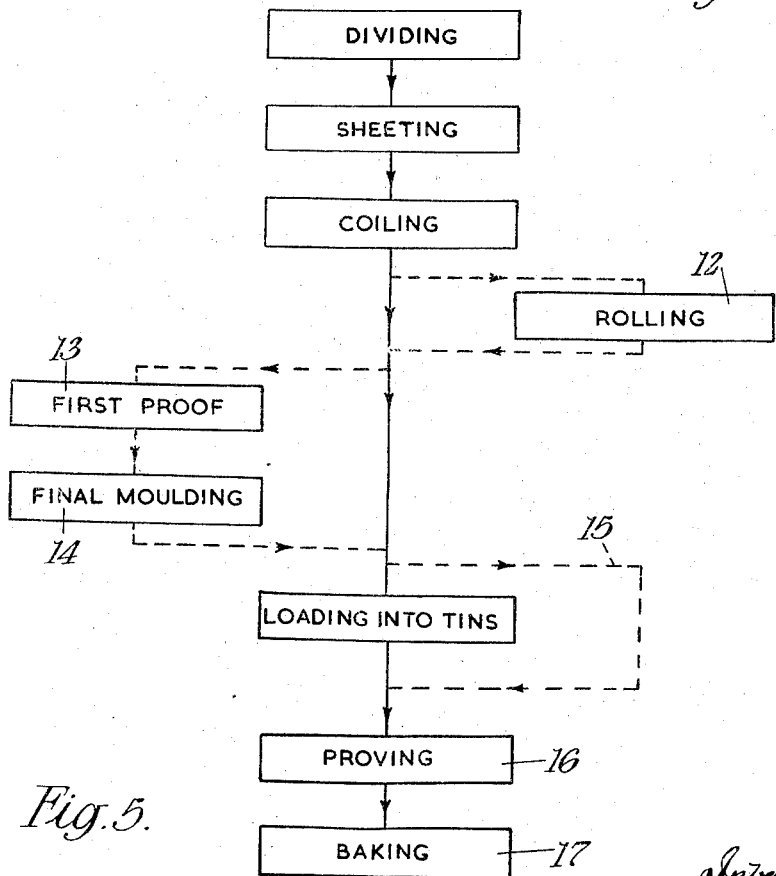
Figure 5 shows a flow pattern for handling the dough piece from the divider into the oven.

After the dough piece has been sheeted and coiled as described above, it may be further dealt with according to several alternative methods now to be described with reference to Figure 5.

The coiled dough piece may be subjected to a rolling process (see step 12 in Figure 5) in known manner for example between two superposed moving bands travelling at different speeds or between a moving band and a stationary surface, where either the band or the stationary surface are beneath the dough piece, or between an arcuate plate and rotary drum.

The coiled dough piece may then be passed either directly from the coiling step or after rolling step 12, to a first prover (see step 13 in Figure 5) the pockets of which, instead of being of the usual semi-spherical form would be elongated to suit the shape of the coiled dough pieces, and thence to a final moulder (step 14) in known manner.

Alternatively, by employing the process according to the present invention, the first proving and final moulding steps 13 and 14 also may be eliminated with little adverse effect on the final texture of the finished loaf, since it has been found that when employing "working" of the dough according to the present invention (that is, after sheeting and coiling only or with possible subsequent rolling step 12) a texture is produced which closely approaches that of a dough piece which has been twice handled in the normal manner, that is, for example, handed up on a conical hander, subjected to first proving and then finally coil moulded. Thus a dough piece treated according to the process of the present invention may be delivered from the coiling device with or without an intervening rolling step 12 direct to the baking tin or proving means (see routing 15 in Figure 5) for proving 16 and baking 17.

I claim:

1. A process of preparing dough pieces for bread baking which comprises the consecutive steps of dividing or cutting from a dough mass or source a dough piece having a predetermined length corresponding substantially to a dimension of the loaf required, and which predetermined length is substantially maintained as a constant dimension throughout the preparation process, re-shaping or working the dough piece so that it is elongated into a sheet while maintaining its width as a sheet at said constant dimension, coiling the sheeted dough piece into a helical roll of a length equal to that of said constant dimension, and loading the coiled dough piece either into a tin or a proving means for proving and baking, with or without intermediate steps of rolling, first proof and final moulding, after the coiling step.

2. A process of forming dough pieces into loaves for bread baking which comprises the consecutive steps of dividing from a raw dough mass, a dough piece having one predetermined linear dimension corresponding substantially to the length of loaf required, thence elongating the dough cells in a direction transverse to the said linear dimension by immediately working the dough piece into a flattened sheet while confining its expansion in the one direction and maintaining its said predetermined linear dimension, and coiling the sheeted dough piece into a helical roll to form a loaf with its length that of the said predetermined dimension.

3. A process of forming dough pieces into loaves for bread bake pans which comprises the steps of working a dough piece having a predetermined length corresponding substantially to the length of loaf required into a flattened sheet while confining its elongation in one direction to maintain its said length and elongate the dough cells in a direction transverse to the said one direction, and coiling the sheeted dough piece into a helical roll such that a loaf of the said length is formed.

References Cited in the file of this patent

UNITED STATES PATENTS

| 1,163,626 | Allison | Dec. 7, 1915 |
| 1,337,152 | Peters | Apr. 13, 1920 |
| 1,730,932 | Glisce | Oct. 8, 1929 |
| 1,753,393 | Van Houten | Apr. 8, 1930 |
| 1,790,589 | McCarthy | Jan. 27, 1931 |

FOREIGN PATENTS

| 584,662 | France | Nov. 24, 1923 |